United States Patent
James

(10) Patent No.: US 12,112,000 B2
(45) Date of Patent: Oct. 8, 2024

(54) MOBILE DEVICE AND METHOD FOR IMPROVING THE RELIABILITY OF TOUCHES ON TOUCHSCREEN

(71) Applicant: Saronikos Trading and Services, Unipessoal LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 0 days.

(21) Appl. No.: 17/041,923

(22) PCT Filed: Mar. 28, 2018

(86) PCT No.: PCT/IB2018/052137
§ 371 (c)(1),
(2) Date: Sep. 25, 2020

(87) PCT Pub. No.: WO2019/186236
PCT Pub. Date: Oct. 3, 2019

(65) Prior Publication Data
US 2021/0048937 A1    Feb. 18, 2021

(51) Int. Cl.
*G06F 3/041* (2006.01)
*G06F 3/04886* (2022.01)

(52) U.S. Cl.
CPC ...... *G06F 3/04186* (2019.05); *G06F 3/04886* (2013.01)

(58) Field of Classification Search
CPC ............. G06F 3/04186; G06F 3/04886; G06F 3/0418; G06F 3/04842; G06F 3/0346; G06F 3/038
See application file for complete search history.

(56) References Cited

U.S. PATENT DOCUMENTS

| | | | | |
|---|---|---|---|---|
| 2009/0174679 | A1* | 7/2009 | Westerman | G06F 3/0418 345/173 |
| 2011/0242032 | A1* | 10/2011 | Seo | G06F 3/04886 345/173 |
| 2012/0019459 | A1* | 1/2012 | Moon | G06F 3/04886 345/173 |
| 2013/0125037 | A1* | 5/2013 | Pasquero | G06F 3/0237 715/773 |

(Continued)

FOREIGN PATENT DOCUMENTS

EP   2 410 416 A1   1/2012
WO   WO-2022197076 A1 *   9/2022   ......... G06F 3/04186

OTHER PUBLICATIONS

International Search Report dated Dec. 4, 2018, issued in PCT Application No. PCT/IB2018/052137, filed Mar. 28, 2018.

(Continued)

*Primary Examiner* — Parul H Gupta
(74) *Attorney, Agent, or Firm* — Workman Nydegger

(57) ABSTRACT

A mobile device and a method for improving the reliability of user's touches on a touchscreen are based on the virtual subdivision of a keyboard zone in an easy zone, where the user can easily play the keys, and a difficult zone, where the user has some difficulty to correctly touch the keys. The touches in the easy zone are not corrected, while the touches in the difficult zone may be corrected according to a number of criteria. In any case the layout of the virtual keyboard does not change.

16 Claims, 2 Drawing Sheets

(56) References Cited

U.S. PATENT DOCUMENTS

| | | | |
|---|---|---|---|
| 2013/0246861 A1* | 9/2013 | Colley | G06F 3/0488 |
| | | | 714/48 |
| 2014/0168083 A1* | 6/2014 | Ellard | G06F 3/041 |
| | | | 345/168 |
| 2016/0004433 A1* | 1/2016 | Wang | G06F 16/335 |
| | | | 715/773 |
| 2017/0255320 A1* | 9/2017 | Kumar | G06F 3/04883 |
| 2018/0005240 A1* | 1/2018 | Hajimusa | G06Q 20/20 |
| 2022/0308733 A1* | 9/2022 | Kim | G06F 3/04186 |

OTHER PUBLICATIONS

Written Opinion dated Dec. 4, 2018, issued in PCT Application No. PCT/IB2018/052137, filed Mar. 28, 2018.

\* cited by examiner

MOBILE DEVICE AND METHOD FOR IMPROVING THE RELIABILITY OF TOUCHES ON TOUCHSCREEN

FIELD OF THE INVENTION

The present invention relates to a mobile device (i.e. a handheld device such as a smartphone, a tablet, or the like) and a method for improving the reliability of user's touches on a touchscreen of said device. In particular, it concerns the correction of the position of a touch made on an on-screen keyboard when the touchscreen is held in one hand and the user, using the fingers or the thumb of that hand, has some difficulty to correctly touch some keys of the on-screen keyboard, such as those near the corners of the virtual keyboard.

DESCRIPTION OF PRIOR ART

Many devices, in particular smartphones, have touchscreens through which a user can input data and commands by touching the keys of virtual keyboards or graphical elements, like buttons, icons, or the like. Touchscreens have many recognized pros, but they may cause errors when it is difficult to reach the position of some keys, as it can happen when the user holds the device with one hand.

To mitigate the effects of bad touches some solutions based on various techniques have been proposed. Some propose arrangements with keyboard layouts in limited zones of the touchscreen, where the keys can easily be reached. This type of solution, however, involves a reduction in the size of the keys, which increases the difficulty of touching them at the appropriate points.

Other solutions are based on the identification of the finger or thumb by which the user has touched a key and the application of some correction of the tactile position accordingly. However, the identification of the hand digits is cumbersome and difficult, therefore this kind of solution is not pretty practical and may leave room for interpretation errors again.

SUMMARY OF THE INVENTION

The present invention aims at solving these and other problems by providing a mobile device and a method for improving the reliability of user's touches on the device touchscreen.

The basic idea behind the method is defining a zone of the touchscreen, called "easy zone", where the user can easily touch the keys of a virtual keyboard displayed on the touchscreen, and a zone called "difficult zone", where the user may have some difficulty to correctly play a key. When the user touches the screen, the position of the touch is computed and it is discerned whether it belongs to the easy or difficult zone. After that, a correction is applied whether the touch belongs to the difficult zone, e.g. if the touch position belongs to the easy zone, the touch may be associated with the key nearest to the computed position, while, if the touch position is in the difficult zone, the touch may be most likely associated with the key which, among those located near the touched point, is the farthest from a point of the easy zone.

The easy zone may be a disc covering the central part of the virtual keyboard and the difficult zone may be the relative complement of the easy zone in the keyboard zone. It is clear, however, that other shapes can be adopted for better fitting the touching range of fingers and thumb. In particular, they may be shaped according to whether said touchscreen is in the right hand or the left hand or both the hands of the user.

The selection of the shapes of the easy zone and difficult zone may be made manually or automatically. In the latter case, it may be made by inferring the use of the user's hands on the basis of the tilt of the touchscreen, which can be derived from data provided by accelerometers.

Moreover, a learning capability may be provided for better inferring whether said touchscreen is in the right hand or left hand or both the right and left hands of the user, namely the position of touches may be corrected on the basis of at least user's habits and/or outcomes of past touches.

Further advantageous features of the present invention are set out in the appended claims.

BRIEF DESCRIPTION OF THE DRAWINGS

These features as well as further advantages of the present invention will become more apparent from the following description of an embodiment thereof as shown in the annexed drawings, which are supplied by way of non-limiting examples, wherein.

DETAILED DESCRIPTION OF THE INVENTION

Any reference to "an embodiment" in this description will indicate that a particular configuration, structure or feature is comprised in at least one embodiment of the invention. Therefore, the phrase "in an embodiment" and other similar phrases, which may be present in different parts of this description, will not necessarily be all related to the same embodiment. Furthermore, any particular configuration, structure or feature may be combined in one or more embodiments as deemed appropriate. The references below are therefore used only for the sake of simplicity and do not limit the protection scope or extent of the various embodiments.

Figure 1:
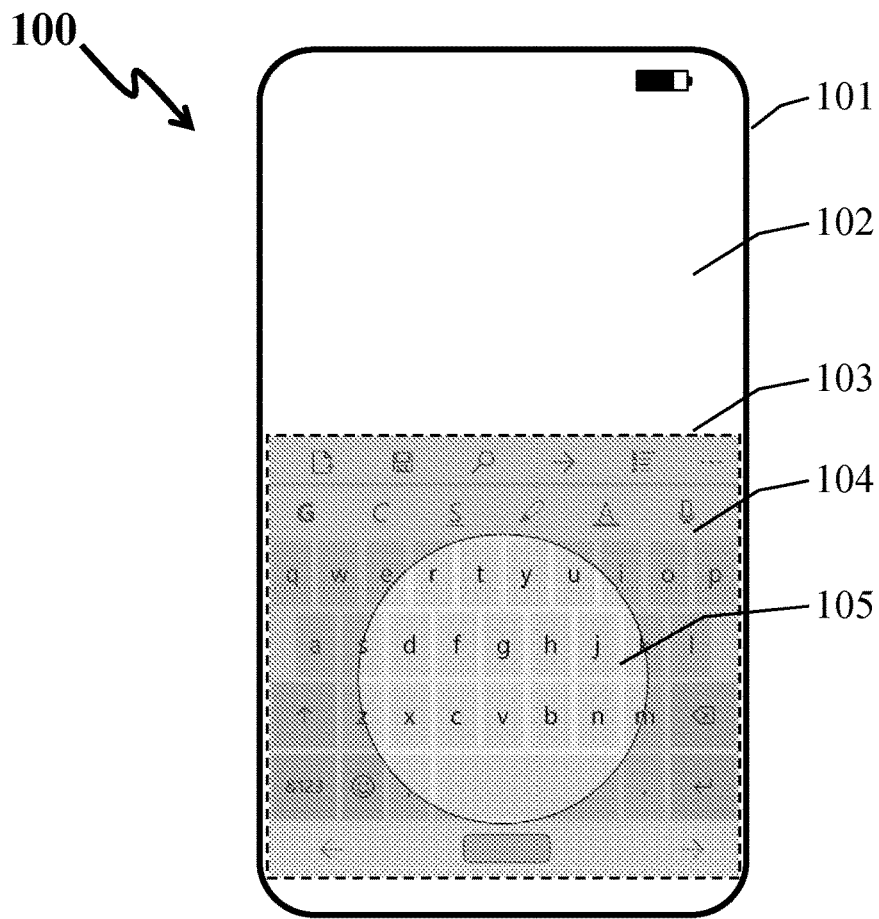
FIG. 1 shows an example of a mobile device, according to the invention, comprising a touchscreen on which a virtual keyboard is displayed.
Figure 2:
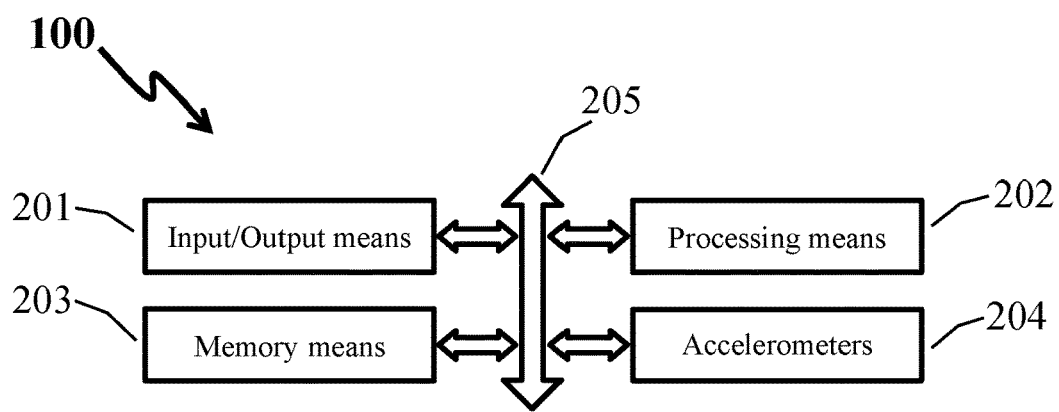
FIG. 2 shows a block diagram representing an architecture of the mobile device according to the invention.
Figure 3:
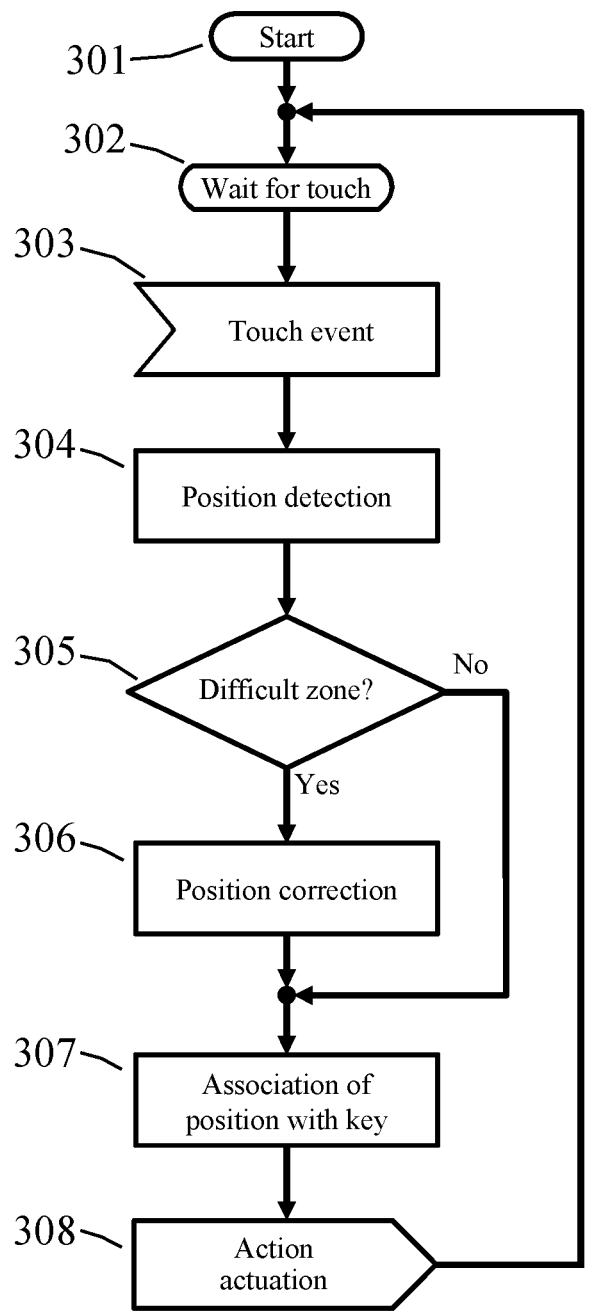
FIG. 3 is a flow chart representing the operation of one possible embodiment of the mobile device depicted in FIG. 2.

The description of the invention is now made with reference to FIG. 1, which shows a schematic representation of a "mobile device" 100 (i.e. a handheld mobile device, such as a mobile phone, a tablet or the like) according to the invention, comprising a touchscreen 102, which can be operated through user's fingers and thumbs, FIG. 2, which shows a block diagram representing the main elements of the mobile device 100 according to the invention, and FIG. 3, which depicts the main phases of the method by which the position of a touch on the touchscreen can be corrected.

On the touchscreen 102 a virtual keyboard 103 is displayed. The zone of this virtual keyboard 103 is virtually subdivided in a "difficult zone" 104, which is shown in a dark color for illustrative purposes, where some correction to the detected user's touches may be applied, and an "easy zone" 105, where no correction is applied.

For the sake of simplicity and illustrative purposes, the easy zone 105 is represented as a disk covering the central part of the keyboard zone 103. However it is clear that its shape, size and position may have many alternatives. In fact it should be designed depending on how the user handles the mobile device 100 and the touchscreen 102. This will be discussed below. On the other hand, the difficult zone 104 may be the relative complement of said easy zone 105 in said keyboard zone 103, or it can also be designed according to other criteria. In particular, it may be a multi-zone, where each of its sub-zones may have different rules for correcting touch positions. Generally the correction amount will be a function of the distance from the easy zone 105 border or from a point in the easy zone 105. However the person skilled in the art understands that a large a variety of criteria and algorithms may be devised for such corrections.

With also reference to FIG. 2, the mobile device 100 comprises at least, processing means 202 (such as a CPU, a microcontroller, an FPGA or the like) and memory means 203 (such as a RAM memory or the like). Moreover, besides said touchscreen 102, the mobile device 100 may comprise other input/output means 201 (such as pushbuttons, loud-speakers, connectors with their controllers, or the like) and other devices, such as accelerometers 204, cameras, compass, or the like. These elements are in signal communication with each other through a communication bus 205. The memory means 203 store data and program codes, while the processing means 202 are configured for performing the following steps:
- receiving signals and data from the input/output means 201 and, in particular, from the touchscreen 102;
- getting data an program codes from the memory means 203;
- executing program codes also on the basis of the signals and data provided by the input/output means 201 and memory means 203;
- storing data in memory means 203;
- emitting signals for outputting information and data through input/output means 201, in order to start actions, such as calling a phone line, opening an application, opening a web page, emitting an alert, and other actions that the mobile device 100 can execute.

Assuming that the keys in the easy zone 105 can be easily reached with the user's fingers or thumbs, the touch correction is usually unnecessary in the easy zone 105. The method for correcting a selected position of a touch according to the invention can be summarized in the following phases, which are represented in the flow chart of FIG. 3:
- starting phase 301, in which the process is activated;
- waiting phase 302, in which the process is waiting for a touch;
- touching phase 303, in which a user inputs a datum by touching a point on a keyboard zone 103 of the touchscreen 102, i.e. the user generates an input signal by touching a point on the keyboard zone 103;
- a detection phase 304, in which a selected position by said touch is computed on the basis of said input signal by means of processing means 202;
- a discerning phase 305, in which it is evaluated, by means of the processing means 202, if said selected position belongs to a predefined easy zone 105 of said keyboard zone 103, or to a predefined difficult zone 104;
- a correction phase 306, in which, if the selected position of said detected touch belongs to said difficult zone 104, a corrected position of said touch is computed, through the processing means 202, on the basis of said selected position, by executing correction instructions defining the correction to apply to touches belonging to said difficult zone 104, otherwise the selected position may be considered as a correct position;
- an association phase 307, in which the selected position (touch detected in the easy zone 105) or corrected position (touch detected in the difficult zone 104) is associated, by means of the processing means 202, with a selected key displayed on said keyboard zone 103;
- an output phase 308, in which the action relevant to the key associated with the touch position is triggered; in other words, a signal corresponding to a touch on said selected key is generated by means of said processing means 202.

By executing this method, the number of typing error due to the shapes of both the user's hand and the mobile device 100 is reduced.

As stated above, in an embodiment of the invention, the predefined easy zone 105 is a disk contained in the keyboard zone 103. In other words, the processing means 202 may be also configured for setting said easy zone 105 as a disk-shaped area contained in said keyboard zone 103. It is emphasized that this particular shape further reduce the number of typing error, especially when typing is performed by user's thumb.

However, the skilled person understands that the easy zone 105 may be designed in a large variety of shapes to fit the reach of the fingers or thumb utilized by the user for making its touches on the touchscreen, without departing from the teaching of the present invention.

The difficult zone 104 may be the relative complement of said easy zone 105 in the keyboard zone 103, and the correction instructions executed by the processing means 202 (during the correction phase 306) may be apt to compute the position correction as a function of the distance of the selected position from a point of the easy zone 105, or from the border of the easy zone 105, or from other geometrical element. That function may be linear, or of a higher order, or exponential, or other types. In this way, it is possible to reduce further the number of typing errors.

In another embodiment of the invention, the difficult zone 104 may be divided in sub-zones, where the correction criteria may be different or have different characteristics. This subdivision may allow a better tailoring of the correction function.

In another embodiment, the correction of the touch position may be carried out with a simple criterion: if the selected position is located between two keys of the difficult zone 104, the corrected position is set in the key which is the farthest from a point of the easy zone 105. In other words, the correction instructions executed by the processing means 202 (during the correction phase 306) may be apt to set the corrected position in the key which is the farthest from a point of said easy zone 105, if said selected position is located between two keys of said difficult zone 104. This criterion reduces the typing error because, in the difficult zone 104, the user tends to touch the touchscreen 102 at distance from the easy zone 105 that is shorter than the required one.

In another embodiment, the shape and position of the easy zone 105 and the difficult zone 104 are set according to whether said touchscreen 102 is in the right hand or in the left hand or in both the right and left hands of the user. So, while the layout of the virtual keyboard does not change, both the shape and position of the difficult zone 104 and easy zone 105 may change and take greater account of the reach of the fingers and thumbs of the two hands. The hand-use mode may be set manually by the user. In other words, the processing means 202 may be also configured for performing (during the discerning phase 305) the following steps (sub-phases):

reading handle data defining whether said touchscreen 102 is in the right hand or the left hand or both the hands of the user;

setting the shape and/or position of the difficult zone 104 and/or the easy zone 105 on the basis of said handle data.

This further reduces the number of typing error made by the user of the mobile device 100.

In another embodiment of the invention, the hand-use mode may be set automatically by assessing the use of the user's hands on the basis of data relevant to tilt and motion characteristics of the touchscreen 102. These data may be provided by accelerometers which detect the inclination of the mobile device 100 with respect to the earth surface and the extension, speed, direction, and radius of curvature of the device motion. More in details, said mobile device 100 may further comprise accelerometers (e.g. a solid state accelerometer) in communication with the processing means 202, which may be also configured to read (during the discerning phase) tilt and motion data, which represents the motion of said mobile device 100, from said accelerometers, and to infer the handle data on the basis of said tilt and motion data. In this ways, it is possible to reduce typing errors without increasing the workload on the user of the mobile device 100.

In another embodiment, a learning capability is provided for better inferring whether said touchscreen 102 is in the right hand or left hand or both the right and left hands of the user, and correcting the position of touches accordingly, on the basis of at least user's habits and/or outcomes of past touches. In other words, the processing means 202 may be also configured for inferring the handle data (during the discerning phase 305) also on the basis of historical data representing at least user's habits and/or outcomes of past touches.

As the learning capability is very effective with a regular user of the device, it greatly improves the correction capability of the mobile device 100, mainly with devices that are for personal use, such as smartphones.

According to the method described above, the mobile device 100 for improving the reliability of a user's touch on a touchscreen 102 is equipped with the processing means 202 that are configured for executing the following steps:

receiving an input signal from said touchscreen 102 carrying data on a user's touch event;

computing, on the basis of said input data, a selected position of said user's touch;

discerning, on the basis of said selected position, if said selected position of the user's touch belongs to a predefined difficult zone 104 or a predefined easy zone 105 of a keyboard zone 103 of said touchscreen 102;

computing a corrected position of said detected touch, if the selected position of said user's touch belongs to said difficult zone 104;

associating said selected position or corrected position with at least one of the keys displayed on said keyboard zone 103 and generating a signal corresponding to a touch on said at least one key.

According to what is said above, the processing means 202 may also be configured for setting the easy zone 105 as a disk contained in keyboard zone 103, or shaping it according to whether the touchscreen 102 is in the right hand or the left hand or both the right and left hands of the user. Correspondingly, it may be configured for setting the difficult zone 104 as the relative complement of the easy zone 105 in said keyboard zone 103 and computing the position correction as a function of the distance of the selected position from a point of the easy zone 105.

In some embodiments, the processing means 202 may be configured for setting the shape and position of said easy zone 105 and said difficult zone 104 according to whether said touchscreen 102 is in the right hand, the left hand, or both the right and left hands of the user.

In some embodiments, the mobile device 100 may also comprise accelerometers 204, and the processing means 202, on the basis of data provided by said accelerometers 204, may be configured for performing the following further steps:

evaluating the tilt and motion of the mobile device 100, inferring whether the user is holding said mobile device 100 in the right hand, the left hand, or both the right and left hands on the basis of said tilt and motion, and automatically setting said easy zone 105 and said difficult zone 104 according to the use of the user's hands.

In other embodiments the processing means 202 may have a learning capability and be configured for inferring whether the user is holding said mobile device 100 in the right hand, the left hand, or both the right and left hands, and correcting the position of touches accordingly, on the basis of at least user's habits and/or outcomes of past touches.

On the other hand, in some embodiments, the processing means 202 may be configured for implementing very simple rules for correcting the user's touches. For example, if the selected position is located between two keys of the difficult zone 104, the processing means 202 may be configured for setting the corrected position in the key which is the farthest from a point of said easy zone 105. The skilled person understands that this criterion can be extended to the selection among a plurality of keys.

The embodiments described above show that the present invention offers a wide range of functionalities for correcting possible touch errors that a user can make on a touchscreen. In fact, it is possible to implement very simple criteria (e.g., selecting the most external key out of a small number of candidate keys) or sophisticated algorithms (e.g., algorithms based on a learning capability, such as Neural Network, or the like).

In any case, it does not involve any change of the virtual keyboard layout, which is a very important requirement for a highly user of keyboards and a definite advantage over prior art solutions.

In another embodiment, the mobile device 100 may also comprise a touch-correcting device 101 comprising processing means that are configured for implementing the invention. In other words, the processing means of said device 101 are configured for performing the same tasks of the processing means 202 according to the previous embodiments. This touch-correcting device 101 may be a touch screen controller modified in order to execute the method according to the invention. In this way, the phases of the methods are executed by a dedicated hardware component, so as the responsiveness the mobile device 100 can be advantageously increased.

Although this description has tackled some of the possible variants of the present invention, it will be apparent to those skilled in the art that other embodiments may also be implemented, wherein some elements may be replaced with other technically equivalent elements. The present invention is not therefore limited to the illustrative examples described herein, since it may be subject to many modifications, improvements or replacements of equivalent parts and elements without departing from the basic inventive idea, as set out in the following claims.

The invention claimed is:

1. A mobile device for improving the reliability of a user's touch on a touchscreen, comprising said touchscreen adapted to display a keyboard zone comprising a plurality of keys, and processing means configured for:
   receiving an input signal from said touchscreen carrying data on a user's touch event;
   computing, on the basis of said input signal, a selected position of said user's touch, said selected position of said user's touch belonging to a first zone of said keyboard zone or a second zone of said keyboard zone, the first zone being separate from the second zone, wherein a plurality of first keys selected from the plurality of keys are disposed within the first zone and a plurality of second keys selected from the plurality of keys are disposed within the second zone;
   discerning whether said selected position of said user's touch belongs to said first zone of said keyboard zone or said second zone of said keyboard zone;
   computing a corrected position for said selected position of said user's touch when said selected position of said user's touch belongs to said first zone, by executing correction instructions defining a correction to apply to said selected position of said user's touch; and
   associating said selected position of said user's touch with at least one of said plurality of keys displayed on said keyboard zone, wherein when said selected position of said user's touch belongs to said second zone, said selected position is associated with a key of said plurality of keys that is nearest to said computed selected position, while when said selected position of said user's touch belongs to said first zone, said selected position is associated with a key of the plurality of keys, which among those located adjacent to said selected position, is farthest from a designated point that is located in said second zone, the designated point having been determined as part of the step of computing the corrected position; and
   generating a signal corresponding to a touch on said at least one of said plurality of keys associated with said selected position of said user's touch.

2. The mobile device according to claim 1, wherein said processing means are also configured for setting said second zone as a disk-shaped area contained in said keyboard zone.

3. The mobile device according to claim 1, wherein said processing means are also configured for setting said first zone as a relative complement of said second zone in said keyboard zone.

4. The mobile device according to claim 1, wherein said processing means are also configured for:
   reading handle data defining whether said touchscreen is in a right hand or a left hand or both hands of the user; and
   setting a shape and/or position of said first zone and/or said second zone on a basis of said handle data.

5. The mobile device according to claim 4, further comprising accelerometers in communication with said processing means, wherein said processing means are also configured for:
   reading tilt and motion data, which represent a motion of said mobile device, from said accelerometers; and
   inferring said handle data on a basis of said tilt and motion data.

6. The mobile device according to claim 4, wherein said processing means are configured for inferring said handle data also on a basis of historical data representing at least user's habits and/or outcomes of past touches.

7. The mobile device according to claim 1, wherein the designated point is located on a border of said second zone.

8. The mobile device according to claim 1, wherein said processor is also configured for setting said second zone as a disk-shaped area contained in said keyboard zone and for setting a remainder of said keyboard zone as said first zone which encircles said second zone.

9. A method for improving the reliability of a user's touch on a touchscreen that comprises a keyboard zone displaying a plurality of keys, comprising:
   a touching phase, wherein a user generates an input signal by touching a point on the keyboard zone of said touchscreen;
   a detection phase, wherein a selected position by said touch is computed on the basis of said input signal by a processor, said selected position belonging to a first zone of said keyboard zone or a second zone of said keyboard zone, the first zone being separate from the second zone, wherein a plurality of first keys selected from the plurality of keys are disposed within the first zone and a plurality of second keys selected from the plurality of keys are disposed within the second zone;
   a discerning phase, wherein it is evaluated, by means of the processor, whether said selected position belongs to said first zone of said keyboard zone or said second zone of said keyboard zone;
   a correction phase, wherein, when said selected position of said detected touch belongs to said first zone, a corrected position of said selected position is computed, through said processing means, by executing correction instructions defining a correction to apply to said selected position;
   an association phase, wherein said selected position is associated, by said processor, with at least one of said plurality of keys displayed on said keyboard zone, wherein when said selected position belongs to said second zone, said selected position is associated with a key of said plurality of keys that is nearest to said selected position, while when said selected position belongs to said first zone, said selected position is associated with a key of said plurality of keys, which among those located adjacent to said selected position, is farthest from a designated point that is located in said second zone, the designated point having been determined by said processor as part of the correction phase; and
   an output phase, wherein a signal corresponding to a touch on said at least one of the plurality of keys associated with the selected position is generated by said processor.

10. The method according to claim 9, wherein said second zone is a disk-shaped area contained in said keyboard zone.

11. The method according to claim 9, wherein said first zone is a relative complement of said second zone in said keyboard zone.

12. The method according to claim 9, wherein said discerning phase comprises sub-phases of:
   reading handle data defining whether said touchscreen is in a right hand or a left hand or both hands of the user; and
   setting a shape and/or position of said first zone and/or said second zone on a basis of said handle data.

13. The method according to claim 12, wherein, during said discerning phase, tilt and motion data representing a motion of said mobile device are read from accelerometers, and said handle data are inferred on a basis of said tilt and motion data by said processor.

14. The method according to claim 12, wherein said handle data are inferred also on a basis of historical data representing at least user's habits and/or outcomes of past touches.

15. A non-transitory computer-readable storage medium which comprises portions of software code for executing the phases of said method according to claim 9.

16. The method according to claim 9, wherein the designated point is located on a border of said second zone.

* * * * *